No. 639,313. Patented Dec. 19, 1899.
M. SWENSON.
LINTER.
(Application filed July 9, 1897.)
(No Model.) 3 Sheets—Sheet 1.

Witnesses.
Inventor.
Magnus Swenson
Attorney

No. 639,313. Patented Dec. 19, 1899.
M. SWENSON.
LINTER.
(Application filed July 9, 1897.)
(No Model.) 3 Sheets—Sheet 3.

Witnesses.

Inventor.
Magnus Swenson
by
Frank L. Dyer
Attorney.

UNITED STATES PATENT OFFICE.

MAGNUS SWENSON, OF CHICAGO, ILLINOIS, ASSIGNOR TO THE AMERICAN COTTON COMPANY, OF NEW YORK, N. Y.

LINTER.

SPECIFICATION forming part of Letters Patent No. 639,313, dated December 19, 1899.

Application filed July 9, 1897. Serial No. 644,027. (No model.)

*To all whom it may concern:*

Be it known that I, MAGNUS SWENSON, a citizen of the United States, residing at Chicago, in the county of Cook and State of Illinois, have invented certain new and useful Improvements in Linters; and I do hereby declare the following to be a full, clear, and exact description of the invention, which will enable others skilled in the art to which it appertains to make and use the same.

My invention relates to various new and useful improvements in linting-machines, by which is included mechanism for removing from seed-cotton the long fiber or staple or for removing the very short fiber left on the seed after the ginning operation. My invention, therefore, is adapted for use both as a "gin" and as a "linter," so called, but it is preferably to be used for the latter purpose.

Linters as they are now made occupy an intermediate position between a gin and a delinter, receiving the seed from the gin and removing the short fiber therefrom, so as to leave upon the seed only the short velvety fuzz, which is ground off or otherwise removed by the delinting-machine.

The objects of my invention are to provide and produce a linter which shall be cheap to construct and operate, efficient in use, and which will require little or no attention.

Broadly considered, the invention consists of a linter having a linting-chamber in which an essentially novel linting operation takes place, said chamber being substantially closed except at the inlet and outlet thereof and having two oppositely-located movable walls, each composed of saws or analogous elements closely arranged together and grooved rollers mounted between said saws.

The invention also consists in combining with the elements referred to an improved device for removing from the linter only the seed from which the lint has been detached, as well as certain details of construction, which will be more fully hereinafter described and claimed.

For a better comprehension of my invention attention is directed to the accompanying drawings, forming a part of this specification, and in which—

Figure 1:
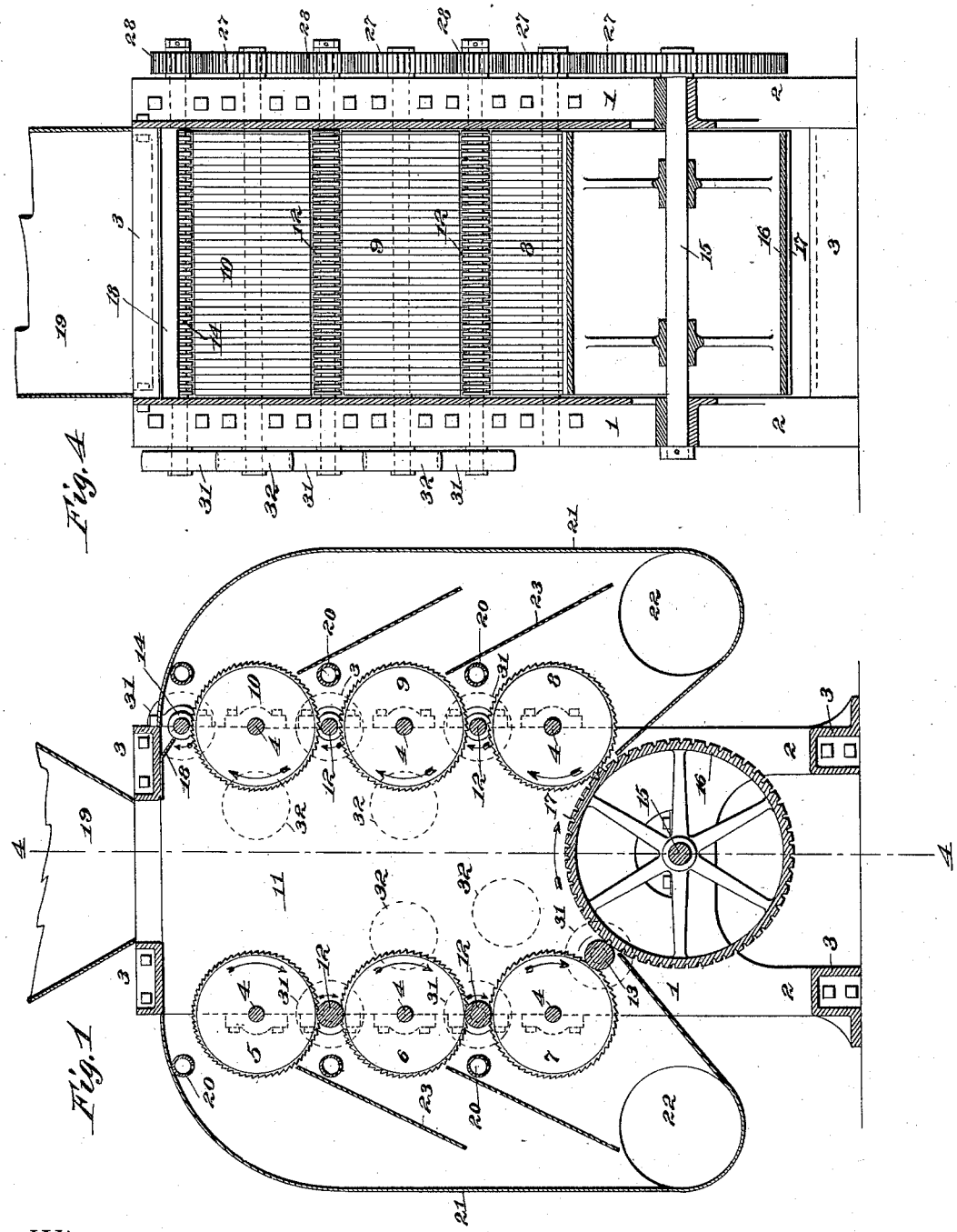
Figure 2:
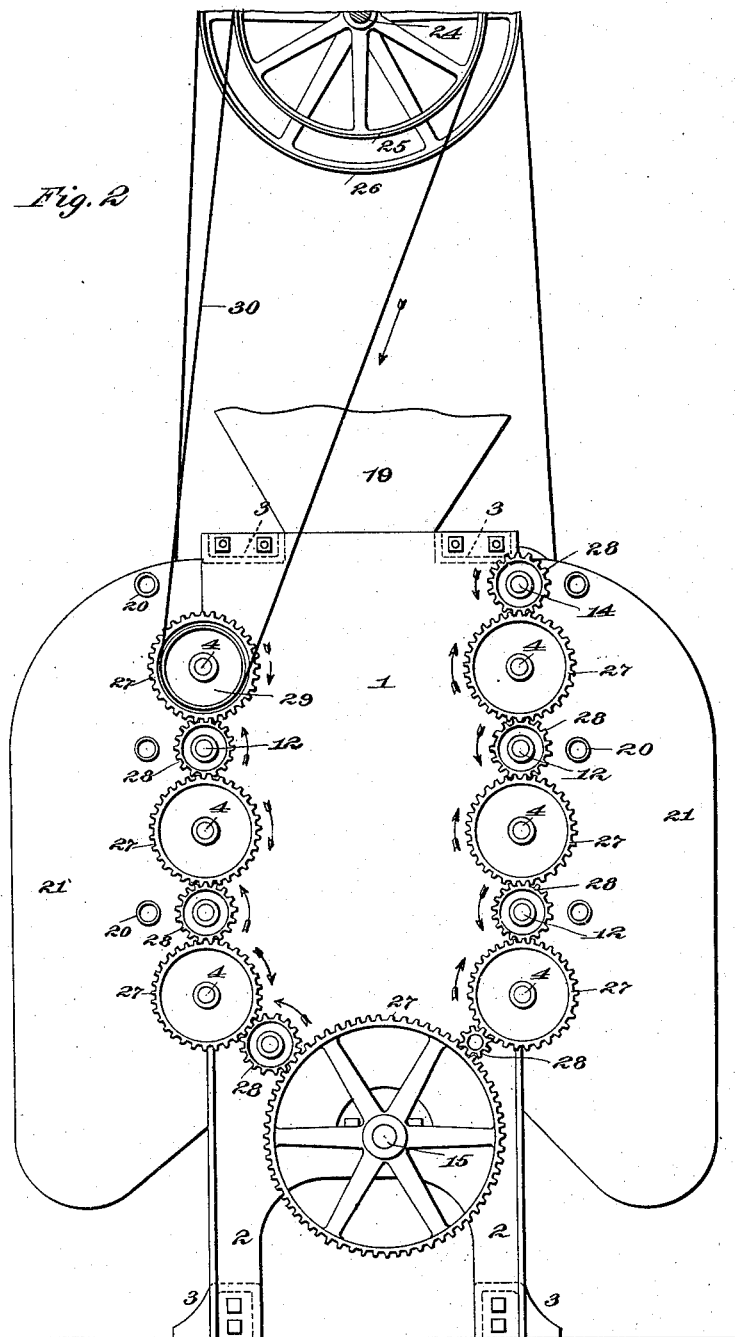
Figure 3:
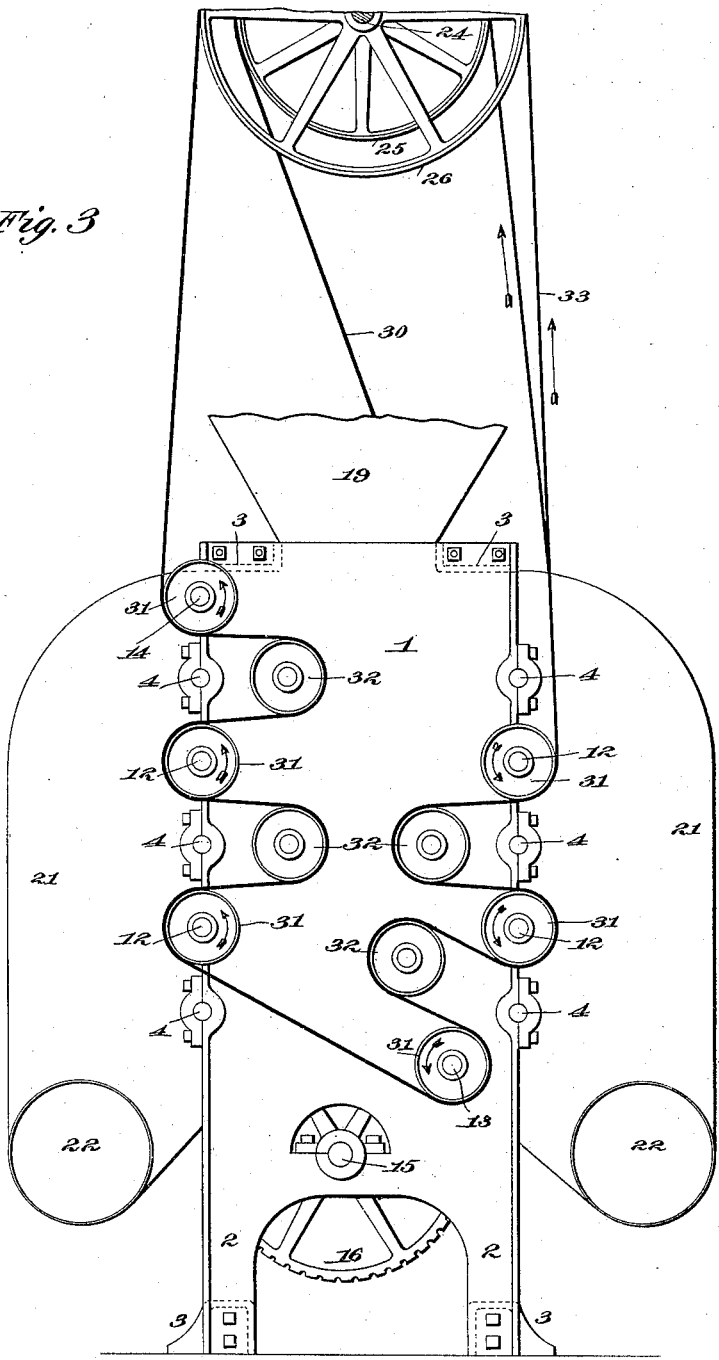

Figure 1 is a vertical sectional view through the center of the device; Fig. 2, an elevation from one side of the machine; Fig. 3, an elevation from the other side of the machine, and Fig. 4 a section on the line 4 4 of Fig. 1.

In all of the above views corresponding parts are represented by the same numerals of reference.

The frame of the machine may comprise two cast side frames 1 1, having depending legs or standards 2 and connected together by cross-frames 3 3, suitably arranged. These side frames 1 1 may be cast solid, so as to comprise the closed sides of the linting-chamber, or they may be skeleton frames, to which wooden sides may be secured.

Mounted in the side frames on suitable shafts 4 are two series or gangs of linting-saws, which I have designated 5, 6, 7, 8, 9, and 10. I show six gangs of linting-saws arranged three in each row, but a greater or lesser number may be used. The gangs of linting-saws are preferably arranged in the same vertical plane, and they, together with the grooved rollers, to be referred to, comprise the front and rear walls of the linting-chamber 11, which occupies the space between them and the sides of the machine. Each gang of linting-saws comprises a large number of circular saws with very fine teeth set upon a shaft and separated by thin disks, as is well known. Mounted between each of the gangs of linting-saws 5 and 6, 6 and 7, 8 and 9, and 9 and 10 is a grooved roller 12, with the grooves of each of which the two adjacent gangs of linting-saws coöperate. Arranged beneath the gangs 7 is a corresponding grooved roller 13, and above the gang 10 is a similar grooved roller 14. All of the linting-saws and rollers referred to rotate in the same direction and preferably at the same peripheral speed, and further on I will describe mechanism for operating these elements.

Mounted at the bottom of the machine on a shaft 15 is a roller 16, having longitudinal pockets 17 in its periphery. This roller extends between the side frames of the machine and works in close proximity to the grooved roller 13 and the gang of linting-saws 8, so that it comprises, essentially, the bottom of the linting-chamber. It also is rotated in the same direction as the saws and at preferably the same peripheral speed. The pockets 17 in the roller 16 are made sufficiently shallow to accommodate a single seed from which the lint has been removed; but each pocket may be made wide enough to accommodate a number of seeds side by side therein.

In order to prevent lint from accumulating on the grooved roller 14, I provide a plate 18 in engagement with the same, which plate may have teeth therein entering the grooves in said roller. This plate by engaging with the roller 14 will remove therefrom any cotton which may tend to accumulate thereon.

The seed from the gin may be fed into the linting-chamber in any suitable way, such as through a chute 19, arranged above the linting-chamber, and, if desired, the linter may be mounted directly adjacent to any form of gin and receive the seed directly therefrom by gravity, if beneath the gin, or in any other way if the linter is located on the same floor as the gin or above the same.

In order to remove the lint from the saws, I preferably make use of blasts of air for this purpose, as has been suggested before, there being a single blast for each saw. For this purpose I may arrange air-conducting pipes 20 parallel with each gang of saws and on the outside of the framework, said pipes having perforations therein coincident with each saw, whereby a blast will be directed tangentially to each saw, as I have indicated in Fig. 1.

The saws and blast-pipes at the outside of the machine may be inclosed by a sheet-metal casing 21, arranged in any suitable way at each side and connected, for example, at the lower end to a flue 22, which conveys the lint to a suitable condenser. If desired, sheet-metal wings or deflecting-plates 23 may be arranged within each casing 21 to separate the blasts of the different gangs of saws, and thereby overcome the possibility of eddy-currents forming in said casing.

In order to drive the saws, grooved rollers, and seed-expelling roller 16, any suitable mechanical connections may be used, and in the drawings I illustrate a convenient arrangement of devices for accomplishing this result.

Mounted above the machine is a countershaft 24, carrying two pulleys 25 and 26 thereon appropriately disposed. The mechanism for driving the linting-saws and seed-roller is arranged at one side of the machine, as shown in Fig. 2, while the mechanism for driving the grooved rollers is arranged at the other side of the machine, as shown in Fig. 3.

Having reference to the first driving mechanism, it may comprise the gear-wheels 27, mounted on the shafts of the gangs of linting-saws and also on the shaft of the seed-expelling roller 16, with intermediate gears 28, which latter may run loose on the shafts of the grooved rollers 12 and 13 or upon bosses surrounding said shafts. The intermediate gear that is located between the driving-gears for the seed-roller 16 and the saws 8 is mounted on a stub-shaft or boss cast with one of the side frames, as will be understood. The system of gearing referred to may be driven from a pulley 29 and belt 30, extending from the driving-pulley 25.

For driving the grooved rollers 12, 13, and 14 I prefer to employ a belt, since, owing to their small diameter, they necessarily rotate at a very much higher rate of speed than the saws, although, as stated, their peripheral speed preferably is the same as that of the saws.

Having reference to Fig. 3, I mount a pulley 31 on the shafts of the grooved rollers 12, 13, and 14, and between each pair of said pulleys is an idler 32, which may be carried on a stub-shaft secured to the side frame or on a continuous shaft extending directly through the linting-chamber and mounted in journals in both side frames.

33 is a belt running from the pulley 26 and passing over the pulleys 31 and idlers 32, as I have shown, for driving all of the pulleys 31 in the same direction and at the same speed.

The operation of my improved linter will be readily understood and is as follows, the saws, grooved rollers, and seed-roller rotating in the directions indicated and at the proper speeds and the blasts from the air-pipes 20 being directed tangentially over the teeth of the saws: The seed from the gin, or if the device is used as a gin then the seed-cotton itself, is introduced into the linting-chamber preferably so as to fill the same and is engaged by the saws, which remove the lint from the seed and carry the lint through the grooves of the grooved rollers. This lint will be blown off the saws by the blasts from the air-pipes into the flues 22, from whence it will be conveyed to a suitable condenser or into a linting-room. The constant rotation of the saws, grooved rollers, and seed-roller in the same direction will give to the bulk of seed in the linting-chamber a continued movement, in Fig. 1 in the direction opposite to the hands of a clock, and this movement will result in the constant presentation of new portions of the mass to the action of the saws. By coöperating with each of the grooved rollers 12 two sets of gangs of saws the rollers will be always kept free of cotton, so that cotton cannot accumulate thereon. The seed-roller 16 working in close relation to the grooved roller 13 serves also to keep that roller free from the accumulation of cotton, while the plate 18, as before stated, serves the same purpose for the grooved roller 14. As the lint is removed from the seed the seed by their weight gradually settle toward the bottom of the machine and enter the grooves 17 of the seed-roller 16, by which they will be carried out of the machine. Any seed which may be disposed in the grooves of said roller and which have not been entirely freed of cotton will be engaged by the saws 9 and swept back into the linting-chamber. In this way it will be seen that only the seed from which all lint has been removed will be expelled from the machine.

While I prefer to make use of the grooved rollers introduced between the gangs of linting-saws, as thereby all possibility of the device becoming choked is entirely overcome, yet in a broad sense the invention is not limited to said rollers, and a combination consisting of the gangs of saws arranged at opposite sides of the linting-chamber and combined with a seed-expelling roller or its equivalent may be employed.

Having now described my invention, what I claim as new therein, and desire to secure by Letters Patent, is as follows:

1. An improved gin or linter, comprising in combination two sets of vertically-arranged gangs of saws, the space between said saws forming a linting-chamber open at the top through which the cotton may be introduced, a corrugated roller at the lower end of said linting-chamber for coöperating with the lower gang of saws of one of the sets, and a roller between said corrugated roller and the lower gang of saws of the other set, substantially as set forth.

2. An improved gin or linter, comprising in combination two sets of vertically-arranged gangs of saws, the space between said saws forming a linting-chamber open at the top through which the cotton may be introduced, a grooved roller between each adjacent pair of gangs of saws and with which the saws coöperate, a corrugated roller at the lower end of said linting-chamber for coöperating with the lower gang of saws of one of the sets, and a roller between said corrugated roller and the lower gang of saws of the other set, substantially as set forth.

3. An improved gin or linter, comprising in combination two sets of vertically-arranged gangs of saws, the space between said saws forming a linting-chamber open at the top through which the cotton may be introduced, a corrugated roller at the lower end of said linting-chamber for coöperating with the lower gang of saws of one of the sets, a roller between said corrugated roller and the lower gang of saws of the other set, and means outside of the machine for removing from the saws the lint detached thereby from the seed, substantially as set forth.

4. An improved gin or linter, comprising in combination two sets of vertically-arranged gangs of saws, the space between said saws forming a linting-chamber open at the top through which the cotton may be introduced, a corrugated roller at the lower end of said linting-chamber for coöperating with the lower gang of saws of one of the sets, a roller between said corrugated roller and the lower gang of saws of the other set, a closed casing surrounding the outside portions of the saws at both sides of the machine, and blast-pipes in said casing for removing from the saws the lint detached from the seed, substantially as set forth.

This specification signed and witnessed this 3d day of May, 1897.

MAGNUS SWENSON.

Witnesses:
D. W. WALBURN,
B. A. JOHNSTON.